(12) United States Patent
Chêtelat

(10) Patent No.: US 12,478,278 B2
(45) Date of Patent: Nov. 25, 2025

(54) SENSOR DEVICE FOR POTENTIAL AND IMPEDANCE MEASUREMENTS

(71) Applicant: CSEM Centre Suisse d'Electronique et de Microtechnique SA—Recherche et Développement, Neuchâtel (CH)

(72) Inventor: Olivier Chêtelat, Cudrefin (CH)

(73) Assignee: CSEM Centre Suisse d'Electronique et de Microtechnique SA—Recherche et Développement, Neuchatel (CH)

( * ) Notice: Subject to any disclaimer, the term of this patent is extended or adjusted under 35 U.S.C. 154(b) by 1186 days.

(21) Appl. No.: 17/356,903

(22) Filed: Jun. 24, 2021

(65) Prior Publication Data

US 2021/0401317 A1 Dec. 30, 2021

(30) Foreign Application Priority Data

Jun. 26, 2020 (EP) .................................. 20182601

(51) Int. Cl.
*A61B 5/053* (2021.01)
*A61B 5/00* (2006.01)
(Continued)

(52) U.S. Cl.
CPC ............ *A61B 5/053* (2013.01); *A61B 5/0531* (2013.01); *A61B 5/305* (2021.01); *A61B 5/308* (2021.01);
(Continued)

(58) Field of Classification Search
CPC ....... A61B 5/053; A61B 5/0531; A61B 5/305; A61B 5/308; A61B 2560/0214;
(Continued)

(56) References Cited

U.S. PATENT DOCUMENTS

2005/0054941 A1\* 3/2005 Ting ..................... A61B 5/6831
600/534
2015/0201858 A1\* 7/2015 Ganim ..................... A61B 5/30
600/393

(Continued)

FOREIGN PATENT DOCUMENTS

EP 2101408 A1 9/2009
EP 2294979 A1 3/2011
(Continued)

OTHER PUBLICATIONS

European Search Report issued Patent Application No. EP 20 18 2601 dated Oct. 8, 2020.
Rapin, Michael: "A Wearable Sensor Architecture for High-Quality Measurement of Multilead ECG and Frequency-Multiplexed EIT", Nov. 9, 2018, XP055737302.
(Continued)

*Primary Examiner* — Justin Xu
(74) *Attorney, Agent, or Firm* — McDonald Hopkins LLC

(57) ABSTRACT

A sensor device for potential and/or impedance measurements on a body of a user, including a central electronic unit and at least a first sensor and a second sensor. Each sensor is connected to the central electronic unit by a one-wire connector. Each sensor includes a current electrode and a potential electrode destined to be in contact with a surface of the body. The master includes a master current source configured to circulate a master current in the one-wire connector, the current electrode of the at least first and second sensors and the body, when the sensors are in contact with a surface of the body. Each sensor includes a harvesting device configured to harvest energy from the circulating master current in a powering frequency band.

13 Claims, 10 Drawing Sheets

(51) Int. Cl.
| | |
|---|---|
| *A61B 5/0531* | (2021.01) |
| *A61B 5/282* | (2021.01) |
| *A61B 5/305* | (2021.01) |
| *A61B 5/308* | (2021.01) |
| *G01R 27/26* | (2006.01) |
| *G01R 29/12* | (2006.01) |
| *H02J 50/00* | (2016.01) |
| *A61B 5/0205* | (2006.01) |
| *A61B 5/0535* | (2021.01) |
| *A61B 5/0536* | (2021.01) |
| *A61B 5/0537* | (2021.01) |
| *A61B 5/291* | (2021.01) |

(52) U.S. Cl.
CPC ............ *G01R 27/26* (2013.01); *G01R 29/12* (2013.01); *H02J 50/001* (2020.01); *A61B 2560/0214* (2013.01); *A61B 2562/222* (2013.01)

(58) Field of Classification Search
CPC .............. A61B 2562/222; A61B 5/291; A61B 5/0205; A61B 5/282; A61B 5/6831; A61B 5/6804; A61B 5/0535; A61B 5/0536; A61B 5/0537; A61B 2562/0209; A61B 2562/06; A61B 2562/164; A61B 2562/221; G01R 27/26; G01R 29/12; H02J 50/001
See application file for complete search history.

(56) References Cited

U.S. PATENT DOCUMENTS

2019/0262605 A1* 8/2019 Babakhani ......... A61N 1/37205
2020/0146585 A1* 5/2020 Liu ..................... A61B 5/7225

FOREIGN PATENT DOCUMENTS

| EP | 2567657 A1 | 3/2013 | |
| EP | 2727528 A1 | 5/2014 | |
| EP | 2803315 A1 | 11/2014 | |
| EP | 2886049 A1 | 6/2015 | |
| EP | 3831289 A1 | 6/2021 | |
| WO | WO-2019053331 A1 * | 3/2019 | ............ A41D 13/12 |

OTHER PUBLICATIONS

Rapin, M., et al.: "Cooperative dry-electrode sensors for multi-lead biopotential and bioimpedance monitoring", Physiological Measurement, Mar. 23, 2015, pp. 767-783, vol. 36, No. 4, Institute of Physics Publishing, Bristol, GB, XP02282136.

Kim, Sunyoung, et al: "A 2.4 A continuous-time electrode-skin impedance measurement circuit for motion artifact monitoring in ECG acquisition systems", VLSI Circuits (VLSCI), 2010 IEEE Symposium ON, Jun. 1, 2010, pp. 210-220, Piscataway, NJ, USA, XP055737524.

Rapin, Michael, et al: "Cooperative sensors: a new wired body-sensor-network approach for wearable biopotential measurement", Proceedings of the 5th EAI International Conference on Wireless Mobile Communication and Healthcare, "Transforming Healthcare Through Innovations" in Mobile and Wireless Technologies, Jan. 1, 2015, XP055693487.

* cited by examiner

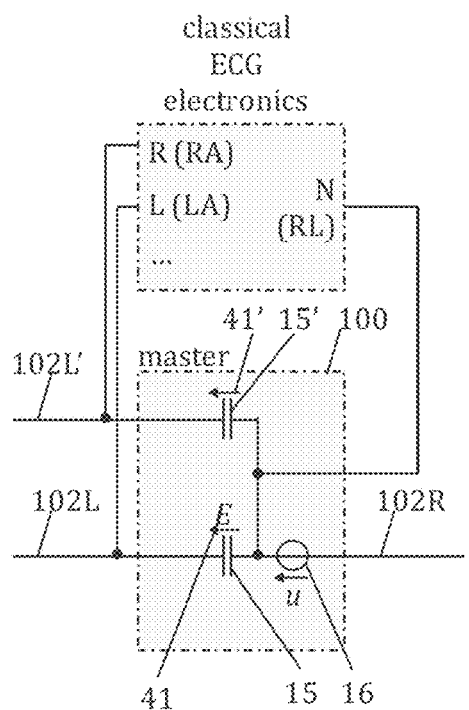
Fig. 17
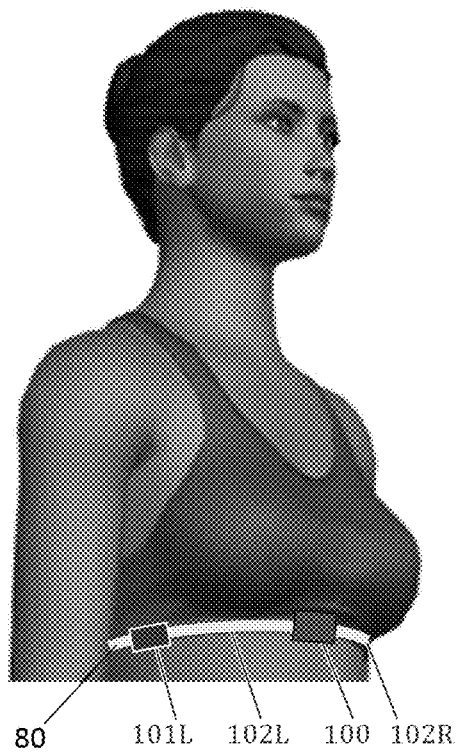 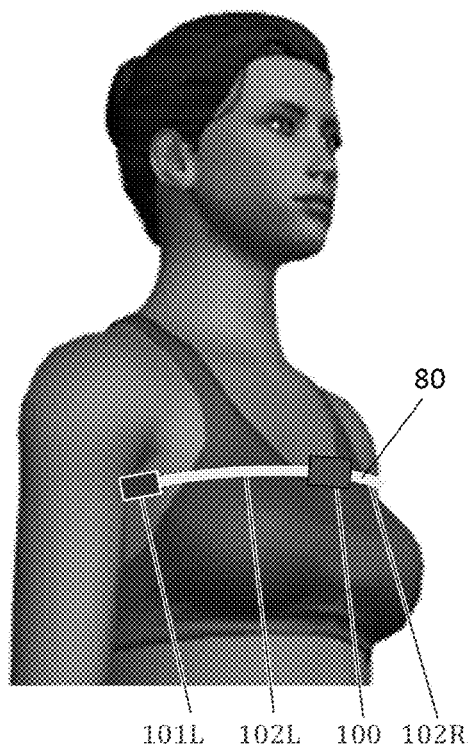
Fig. 18a                Fig. 18b

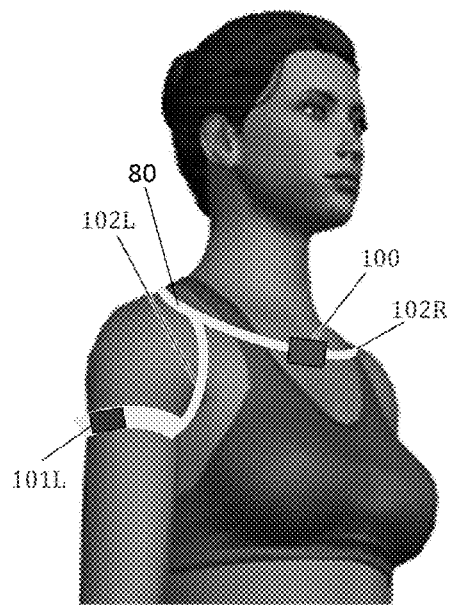
Fig. 19
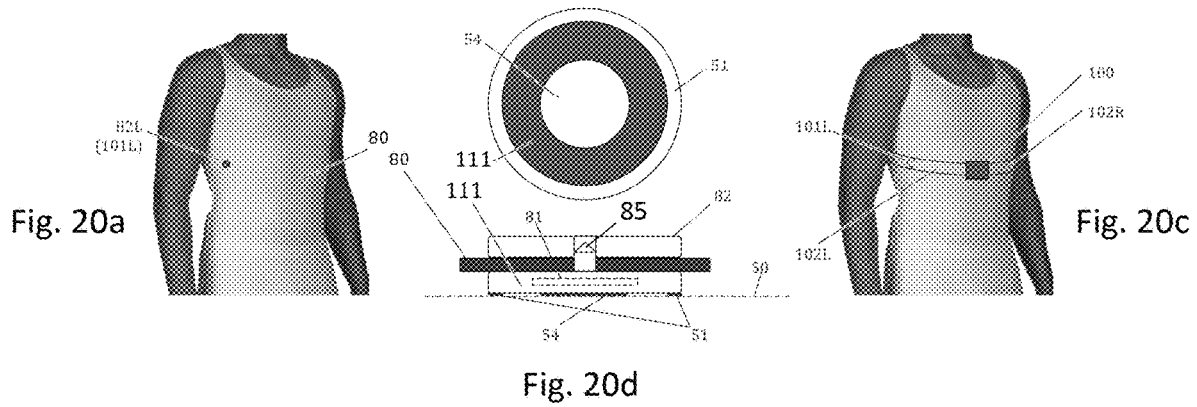
Fig. 20b
Fig. 20a
Fig. 20c
Fig. 20d

SENSOR DEVICE FOR POTENTIAL AND IMPEDANCE MEASUREMENTS

TECHNICAL DOMAIN

The present disclosure concerns the field of bio-potential and bio-impedance measurements with active electrodes.

RELATED ART

Bio-potentials can include, for instance, ECG (electrocardiogram, e.g., for heartrate and heartrate variability), EEG (electroencephalogram), EMG (electromyogram), EOG (electrooculogram), etc. Bio-impedances provides information, for instance, for respiration rate and magnitude, BIS (bio-impedance spectroscopy, e.g., for body composition), EIT (electrical impedance tomography), etc.

Document EP2803315 discloses a measurement of bio-potentials using a measurement device comprising electrodes being connected to a central electronic unit (master). The electrodes are passive (in contrast to active electrodes) and are complemented by an additional electrode connected to a shield protecting the electrode and the wire against electric disturbances. However, the disclosed device is not suited for the measurement of bio-impedances. Moreover, the signal quality of bio-potentials measured with passive electrodes is limited, especially if the electrodes are used in dry conditions (e.g., unwetted or without sweat).

EP2101408 from the present applicant discloses a measurement circuit comprising cooperative sensors for the measurement of bio-potentials and bio-impedances with active bi-electrodes connected to a 1-wire bus. The measurement circuit features remarkably high input impedance. Moreover, the current to cross the tissue to be measured is diverted via one electrode of bi-electrode cooperative sensor so that the potential measured at the other electrode is undisturbed. However, the sensors must be powered by their own power supply (e.g., battery) and cannot be powered via the 1-wire bus.

EP3831289 from the present applicant discloses cooperative sensors for the measurement of bio-potentials and bio-impedances with active bi-electrodes connected to a 1-wire bus. The sensors are remotely powered in parallel by the master via the 1-wire bus and the body which serves as second wire. Therefore, the master must have an electrode (or a bi-electrode) in contact with the body.

SUMMARY

The present disclosure concerns a sensor device for potential and/or impedance measurements on a body of a user, comprising a master and at least a first cooperative sensor and a second cooperative sensor. Each cooperative sensor is connected to the master by a one-wire connector. Each cooperative sensor comprises a current electrode and a potential electrode destined to be in contact with a surface of the body. The master comprises a master power supply (e.g., current source) configured to circulate a master current in the one-wire connector, the current electrode of said at least first and second cooperative sensors, and the body, when the cooperative sensors are in contact with a surface of the body. Each cooperative sensor comprises a harvesting device configured to harvest energy from the circulating master current in a powering frequency band.

The current and potential electrodes together with an electronic circuit make an active bi-electrode which improve the measurement performances when used as dry electrode (unwetted).

The sensor device allows for any stray current, e.g., due to electric coupling with the mains, ESD, etc., that can be picked up by the connectors to flow across the body via the current electrode without disturbing the measured bio-potential or bio-impedance, despite of the absence of shield for the connectors.

Since the cooperative sensors are remotely powered, they can comprise additional sensors, such as optical sensors (e.g., photo-plethysmography, used for instance for non-occlusive blood pressure, oBPM®, pulse oximetry, etc.), acoustic sensors (e.g., phonogram, for instance for heart, lung, or digestive-track sounds, voice, snore, groan, etc.), temperature sensors (skin and core body temperatures), chemical sensors (sweat composition), impedance sensors (EDA, i.e., electrodermal activity also known as GSR, i.e., galvanic skin response), etc.

Very high input impedance can be reached thanks to a robust bootstrapping technique similar to that described in document EP2101408B1, where the potentials of the power supply (e.g., GND and VCC) follows the measured potential thanks to a feedback loop.

In contrast to cooperative sensors used in documents EP2101408 and EP3831289, the sensor device disclosed herein does not require a master comprising a bi-electrode or single electrode. This simplifies the integration in a wearable since the master does not have to be in contact with a body surface.

The cooperative sensors do not need a battery or other form of local power supply. This makes the cooperative sensors smaller, lighter, thinner, and washable. The cooperative sensors can be permanently embedded in the garment and the master easily detached from the garment.

The sensor device of the invention allows the current flowing in the body to power twice as many cooperative sensors than what is achievable according with known cooperative sensors. The current can thus be lowered to follow user's safety guidelines.

In the case one of the cooperative sensors remains in contact with a body surface, only the signals relative to the cooperative sensors having lost contact with the body surface are void. In known devices, there is always one electrode or sensor (e.g., guard or reference) that can void all measured signals in case of loss of contact with the body surface.

SHORT DESCRIPTION OF THE DRAWINGS

Exemplar embodiments of the invention are disclosed in the description and illustrated by the drawings in which:

FIG. 17 illustrates the sensor device comprising conventional ECG electronics;

FIGS. 18a and 18b show the sensor device comprising a garment including the master and the cooperative sensors, according to an embodiment;

FIG. 19 shows a variant of the sensor device comprising a garment; and

FIGS. 20a-20d show another variant of the sensor device comprising a garment.

EXAMPLES OF EMBODIMENTS

Figure 1:
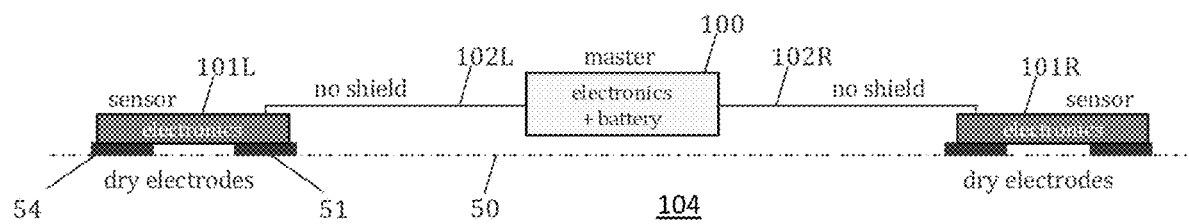
FIG. 1 illustrates schematically a sensor device comprising a master and a first and second cooperative sensor, each cooperative sensor being connected to the master by a one-wire conductor; according to an embodiment.

FIG. 1 illustrates schematically a sensor device for potential and/or impedance measurements on a surface 50 of a body 104 of a user, according to an embodiment. The sensor device comprises at least a first cooperative sensor 101L connected to a master 100 by a first one-wire connector 102L and a second cooperative sensor 101R connected to the master 100 by a second one-wire connector 102R. Each cooperative sensor 101L, 101R comprises a current electrode 51 and a potential electrode 54 destined to be in contact with a surface 50 of the body 104 when the sensor device is worn by the user.

Figure 2:
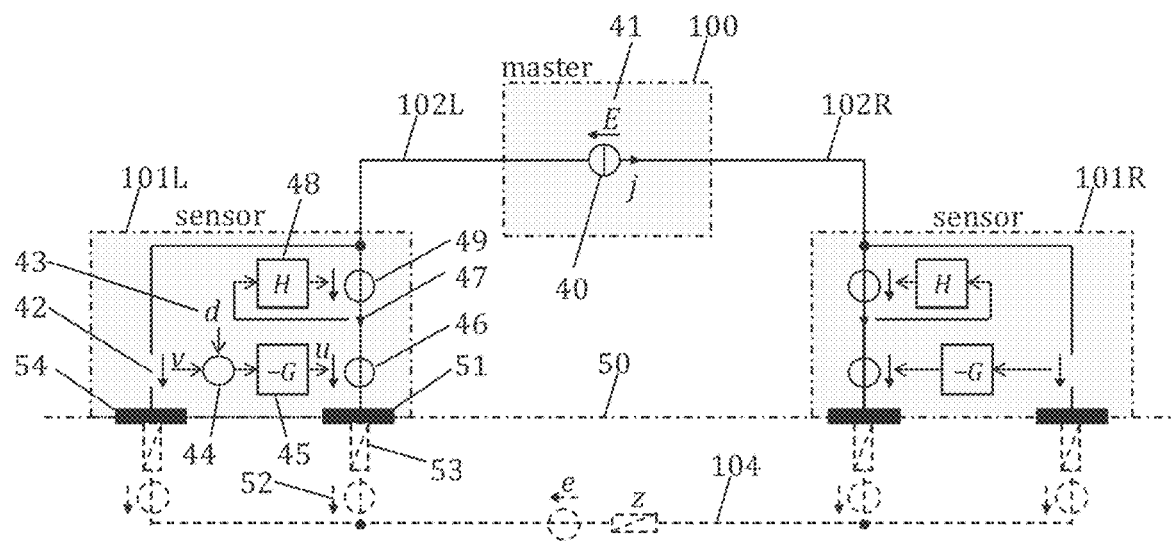
FIG. 2 shows the sensor device according to a possible embodiment.

FIG. 2 shows the sensor device according to a possible embodiment. The master 100 comprises a master current source 40 configured to circulate a master current "j" 47 in the conductors 102L, 102R in the current electrode 51 of the first and second cooperative sensors 101L, 101R and the body 104, when the cooperative sensors 101L, 101R are in contact with a surface 50 of the body 104.

Figure 3:
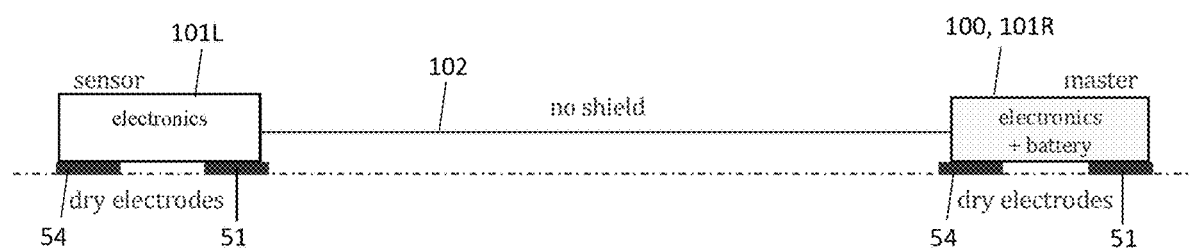
FIG. 3 shows a particular arrangement of the sensor device.

As suggested by FIGS. 1 and 2, each of the cooperative sensors 101L, 101R and the master 100 can be distinct physical entities cooperating with each other via the conductors 102L, 102R. However, the master 100 can be arranged with at least one of the cooperative sensors 101L, 101R in a single housing. An example of such configuration is shown in FIG. 3 where one cooperative sensor 101R is arranged with the master 100 in a single housing. In this configuration, the cooperative sensors 101L, 101R are electrically connected to the master, and powered, by the conductor 102L, 102R.

As shown in FIG. 2, each cooperative sensor 101L, 101R comprises a harvesting device H (47, 48, and 49) configured to harvest energy from the circulating master current 47 in a powering frequency band.

In one aspect, the powering frequency band can be about 1 MHz or greater.

In one aspect, the harvesting device comprises a harvesting voltage source 49 having a harvesting transfer function "H" 48 of the master current 47. The function "H" may be for instance $u_0 \cdot sign(j)$, where $u_0$ is a constant and j the master current 47.

In another aspect, the master 100 can be configured to measure a biopotential e of the body 104 from a master voltage E 41 across the master current source 40, when the master voltage 41 is in a bio-potential frequency band. The bio-potential frequency band can be for instance between 0.5 Hz and 150 Hz.

In yet another aspect, the master 100 is configured to measure a bio-impedance "z" of the body 104 from the master voltage 41 when the master current 47 is in a bio-impedance frequency band. The bio-impedance frequency band can be for instance between 49.5 kHz and 50.5 kHz. For the measurement of bio-impedance "z", the current source 40, in addition to its component in the powering frequency band, has a component in the bio-impedance frequency band, for instance at about 50 kHz. The master voltage E 41 in the bio-impedance frequency band is then proportional to "z".

In an embodiment, the first cooperative sensor 101L comprises a sensor voltage source 46, an adder 44 and a controller 45 having a transfer function-G. The adder 44 is configured to sum a controller voltage v 42 to a transfer signal d provided by a transfer voltage source 43 and input the sum in the controller 45. The controller 45 is configured to set the controller voltage 42 equal to the opposite of the transfer signal d and to output a voltage u of the sensor voltage source 46. The second cooperative sensor 101R in the embodiment shown in FIG. 2 does not comprise the transfer voltage source 43 (transfer signal d=0).

The electrode potential 52 under the potential electrode 54 can be considered "0" beyond the electrode-potential frequency band, e.g., <0.05 Hz. The transfer signal d can be set to "0" in the bio-potential and bio-impedance frequency bands.

In one aspect, the transfer function-G of the controller 45 can be chosen such that the rejection frequency band of a control loop of the controller 45 is maximal in the bio-potential and bio-impedance frequency bands ($|G|\gg 1$), but minimal in the powering frequency band ($|G|<1$).

If in addition the transfer function-G of the controller 45 can be chosen such that the rejection frequency band of the control loop is also maximal ($|G|\gg 1$) in the communication frequency band, e.g., from 150 to 49.5 kHz, such that the master voltage 41 also includes the transfer signal d. Therefore, the communication frequency band can optionally be used to transfer signals d other than bio-potential and bio-impedance signals. For example, the transfer signals d can be used to transfer signals provided by optical sensors (e.g., photo-plethysmography, used for instance for non-occlusive blood pressure, oBPM®, pulse oximetry, etc.), acoustic sensors (e.g., phonogram, for instance for heart, lung, or digestive-track sounds, voice, snore, groan, etc.), temperature sensors (skin temperature), chemical sensors (sweat composition), impedance sensors (EDA, i.e., electrodermal activity also known as GSR, i.e., galvanic skin response), etc.

In the configuration of the harvesting device 48, 49 as shown in FIG. 2, the master current 47 powering the cooperative sensor 101L, 101R flows across the current electrode 51 and not via the potential electrode 54. Any unexpected voltage disturbance the harvester may produce in the bio-potential, bio-impedance, or communication frequency bands is rejected by the controller 45. The harvesting device 48, 49 could also be arranged otherwise, for instance, directly on the connector 102L, 102L, or below or combined with the sensor voltage source 46.

Figure 4:
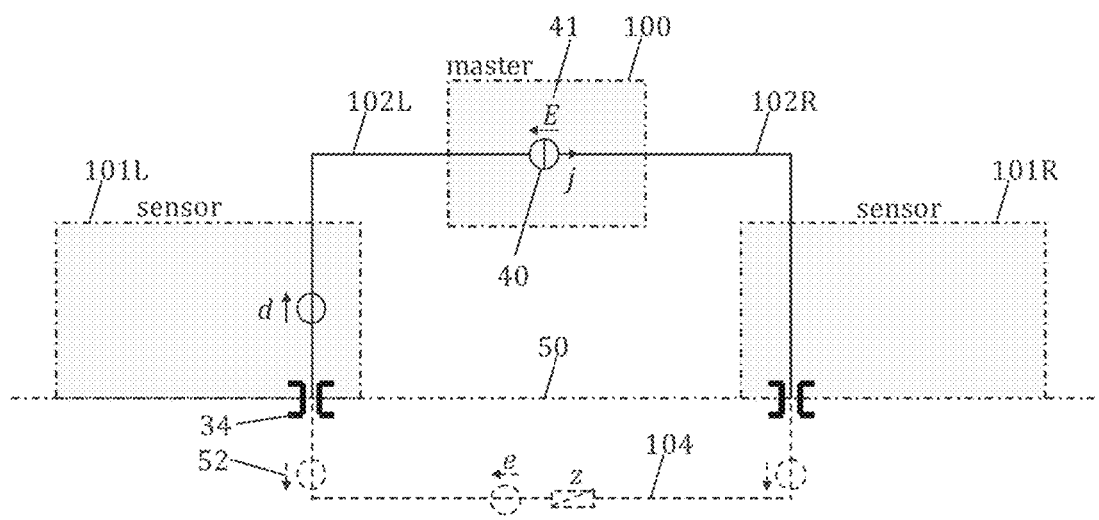
FIG. 4 shows a simplified schematic of the sensor device of FIG. 2.

FIG. 4 shows a simplified model of the metrological functions of the circuit of FIG. 2. The purpose of the controller 45 in FIG. 2 is to virtually suppresses the electrode impedance 53. This is symbolized with the pass-through circuit 34. With the pass-through circuit symbol 34, the communication of transfer signal d is equivalent to a voltage source with voltage d. Assuming that the electrode voltage 52 is negligible, the master voltage 41 corresponds to equation (1) for the bio-potential, bio-impedance, or communication frequency bands:

$$E = e + jz + d. \tag{1}$$

The bio-potential signal e, bio-impedance signal z and the communication signal d (or transfer signal d) can thus be easily extracted from the master voltage E 41 by filtering.

Figure 5:
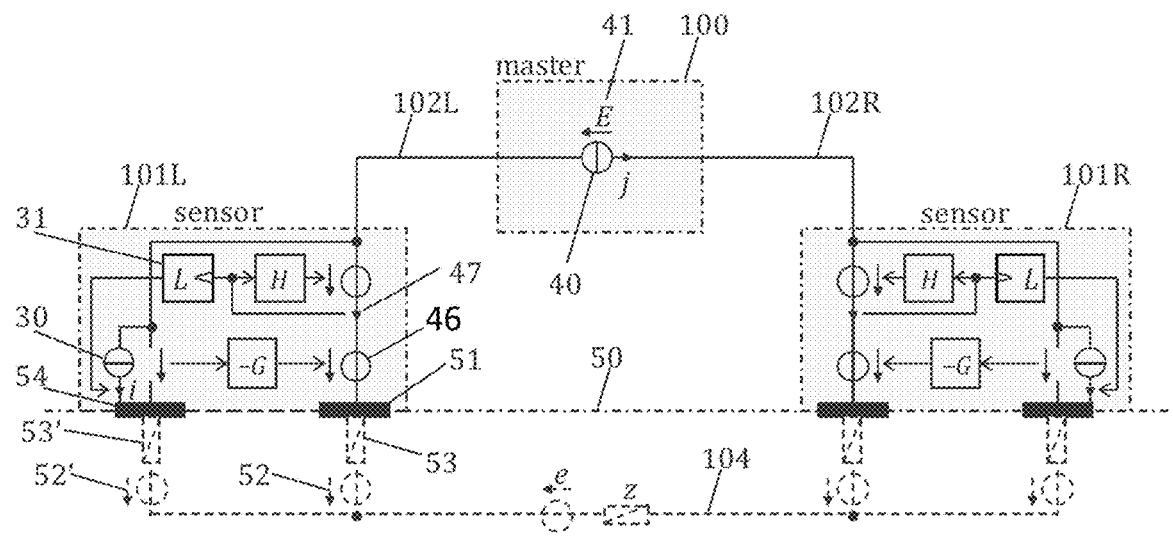
FIG. 5 shows the sensor device, according to another embodiment.

FIG. 5 shows the sensor device according to another embodiment. In addition to the sensor device circuit shown in FIG. 2, the cooperative sensor 101L, 101R of FIG. 5 further comprises a logic circuit L 31 that is clocked from the rising and/or falling edges of master current 47. The master current 47 can comprise a square wave at 1 MHz, i.e., periods of 1 μs. By replacing a 1 μs period by two 0.5 μs periods (or two 1 μs periods by one 2 μs period), one can associate a different state for the 1 μs period (e.g., "0") and another for the two 0.5 μs period (e.g., "1"). Therefore, a stream of bits can be sent from the master 100 to the cooperative sensors 101L, 101R. Such information can be a low-frequency synchronization signal used to reset the logic circuit 31 of each cooperative sensor 101L, 101R, for instance if all bits being at "0", except one bit at "1" every 1 s. Such information can also be any kind of control signal addressed to a specific set of cooperative sensors 101L, 101R.

The sensor device in FIG. 5 further comprises a sensor current source i 30 configured to inject a sensor current i into the electrode impedance 53' of the potential electrode 54. The sensor current i may be a square wave at 500 Hz so that the resulting voltage across the electrode impedance 53' is part of the bio-potential signal E 41, e.g., sampled at 1 kHz. Simple post filtering can extract from the bio-potential signal E the bio-potential e and the voltage across the electrode impedance 53' which is proportional to the electrode impedance 53'. It is useful to know the electrode impedance 53' to assess the quality of the electrode contact with the body surface 50 (the lower the electrode impedance 53', the better). The electrode impedance 53' may also be used in advance filtering to remove the electrode voltage 52' from the bio-potential signal 41, which variations are assumed linked to variations of the electrode impedance 53'.

Figure 6:
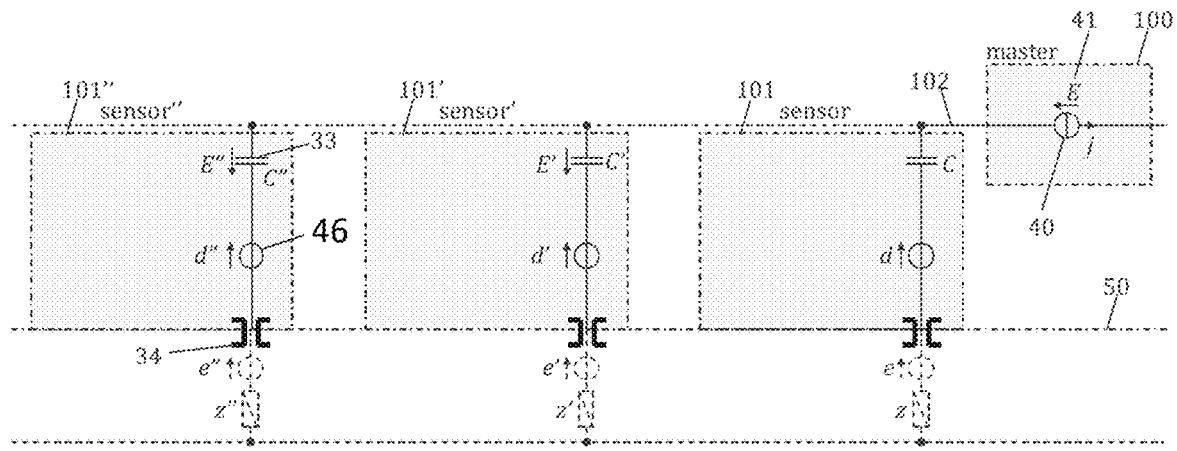
FIG. 6 represents a possible arrangement of a plurality of cooperative sensors to a single connector, according to an embodiment.

FIG. 6 represents a possible way to combine several cooperative sensors 101, 101', 101" on one (single) connector 102 (for example on the first connector 102L). FIG. 6 shows three cooperative sensors 101, 101', 101" connected to one connector 102, but other number of sensors is possible. Also, a plurality of cooperative sensors 101, 101', 101" can be connected to another connector 102 (for example on the second connector 102R). With more than the pair of cooperative sensors 101L and 101R, the modelling of the bio-potential e and bio-impedance z of the body 104 with a simple circuit is not unique (the body is in reality a continuum of impedance and voltage source that can be rigorously modelled with a Thevenin equivalent only for two cooperative sensors). Therefore, the body model of FIG. 6 (which is not and cannot be just an extension of that of the previous figures) redefine e and z so to be modelled below each sensor (instead of between a pair of sensors).

Each cooperative sensor 101, 101', 101" can comprise a capacitance 33. The capacitance 33 can serve to substantially equally distributes the master current j 47 between the cooperative sensors 101, 101', 101". The capacitance 33 can be further configured to average biopotentials "e", bio-admittances (y=1/z, i.e., i.e., bio-admittances y are the inverse of their corresponding bio-impedances z) and a transfer signal d from the plurality of the cooperative sensors 101, 101', 101" connected to the master 100 by a same connector 102, when the cooperative sensors 101, 101', 101" are in contact with the body surface 50. For accurate averaging of bio-potentials e, e', e", bio-admittances y, y', y", and transmitted signals d, d', d", the impedance of the capacitances C, C', C" for each cooperative sensor 101, 101', 101" should be high in the corresponding frequency band as compared to the bio-impedance z so that the latter is negligible.

The plurality of cooperative sensors 101, 101', 101" connected to one same connector 102 can transmit their respective transfer signal d on different channels, for instance time slots for time multiplexing or frequency bands for frequency multiplexing. Any transmitted signal d 43 can then be recovered from the master voltage 41 with a gain inversely proportional to the number of cooperative sensors 101, 101', 101" in contact with the body surface 50. Additional cooperative sensors allow more channels and access to different positions, still with only two connections to the master 100.

For each cooperative sensor 101, 101', 101", a capacitance voltage Eon the capacitance resulting from the bio-potential e (assuming the capacitance C 33, equal for all cooperative sensors 101a, 101b) corresponds to equation (2):

$$E' = \frac{e'}{N} - \langle e \rangle \tag{2}$$

where N is the number of cooperative sensors 101, 101', 101" connected on the same connector 102 and (e) the average of all bio-potentials e, e', e" of the cooperative sensors 101, 101', 101". The same equation holds, in the bio-impedance frequency band, for the voltage on z' resulting from a current/flowing across the bio-impedance z'.

The voltage source d' 46 can be used in the bio-impedance frequency band to induce the current j', according to equation (3):

$$j' = dC\omega i \frac{N-1}{N} \tag{3}$$

where ω is the angular pulsation used for the bio-impedance measurement and i is the unit imaginary number. If two voltage sources d' and d" 46 work in opposition, the disturbance on the master voltage E 41 can be minimized. The above equations assume that the capacitances C, C', C", are equal and the bio-impedance z, z', z", negligible. If these assumptions cannot be made, the equations are more complex, but can still be exactly solved for the bio-potentials e, e', e", and the bio-impedances z, z', z".

Figure 7:
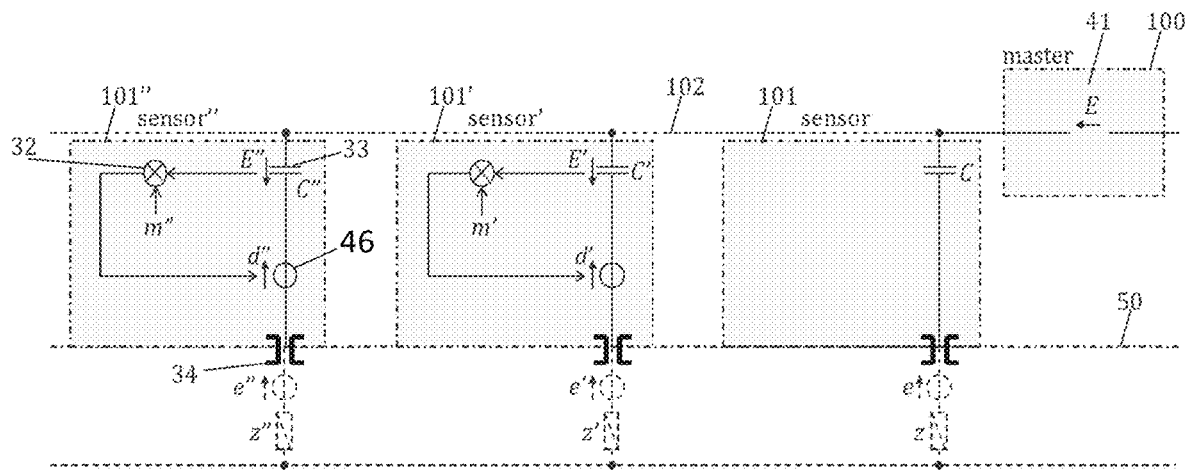
FIG. 7 shows the sensor device, according to yet another embodiment.

The capacitance voltage signal E' (or E") of a given cooperative sensor 101', (or 101", respectively) can be sent to the master 100 via the transfer signal d' (or d", respectively), provided that a modulation is performed so that the transfer signal d' (or d", respectively) uses another frequency band. FIG. 7 shows the sensor device according to an embodiment wherein each cooperative sensor 101', 101" comprises a modulator 32 configured to modulate the capacitance voltage E' (or E", respectively) across the capacitance 33 with a carrier m' (or m", respectively) and output the transfer signals 43. In case of amplitude modulation (AM), a simple multiplication between the capacitance voltage signal E' and the carrier m' is required to obtain the transfer signals d' 43, i.e., d'=m' E'.

Figure 8:
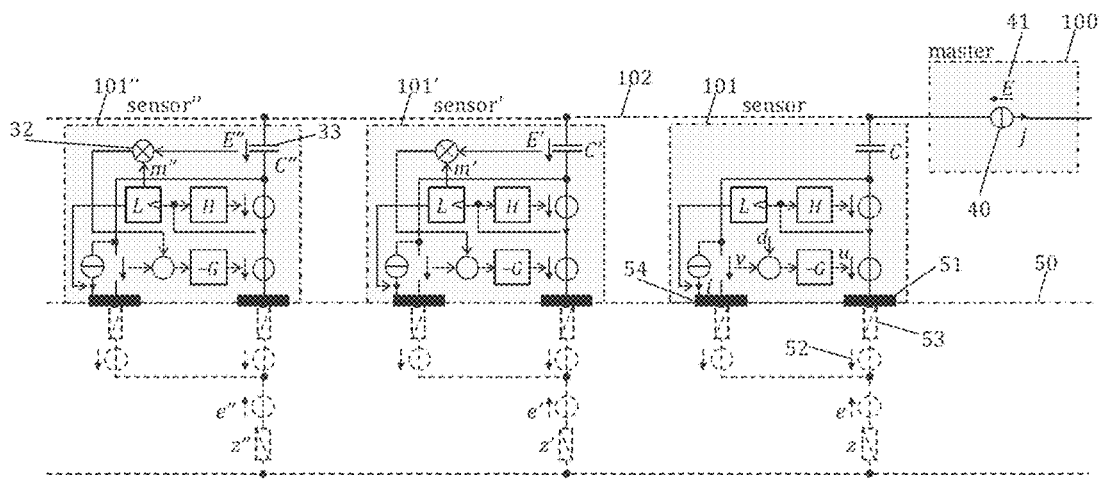
FIG. 8 shows a complete circuit diagram of the sensor device of FIG. 7.

FIG. 8 shows the complete circuit diagram of the sensor device of FIG. 7.

Example of Implementation

Figure 9:
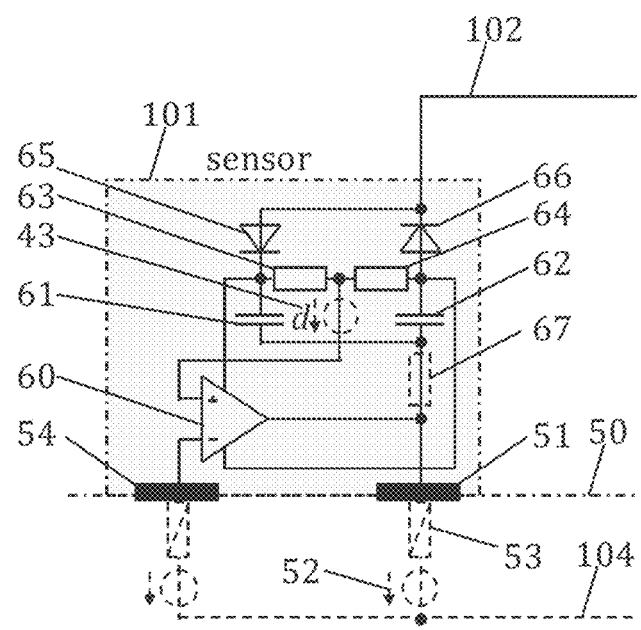
FIG. 9 shows a possible implementation of a cooperative sensor comprising an operational amplifier.

An implementation example of the second cooperative sensor 101R of FIG. 2 (i.e., with d=0, or without the transfer voltage source 43) is shown in FIG. 9. The resistances 63 and 64 provide a voltage divider between the positive and negative power-supply terminals of an operational amplifier 60. The resistances 63 and 64 define a potential between the positive and negative power-supply terminals, in the middle if they are equal. The operational amplifier 60 performs the functions of adder 44, controller-G (45), and voltage source 46. Two diodes 65 and 66 together with the energy-storage capacitance 61 and 62 fulfil the function of the harvester H (47, 48, and 49). Note that the functions of the two voltage sources 46 and 49 are combined since the output of the operational amplifier 60 is connected to the common terminal of the two energy-storage capacitances 61 and 62, itself connected to the current electrode 53. The resistances 63 and 64 also help to divide the master voltage E 41 in the powering frequency band substantially equally between the first and second cooperative sensors 101L and 101R in case there is slight unbalance between power consumption of the two cooperative sensors 101L, 101R. Another way to force balancing is to add a Zener diode (not shown) or equivalent between the positive and negative power-supply terminals. The Zener diode also limits the power-supply voltage and prevents the voltage on the master current source 40 to reach saturation. The resistance 67 is optional, but may help to get stability, since operational amplifiers are usually not designed to drive capacitances due to the compensation of their middle stage behaving as integrator. An amplifier without this internal integrator would be intrinsically more stable to drive a capacitive load.

Figure 10:
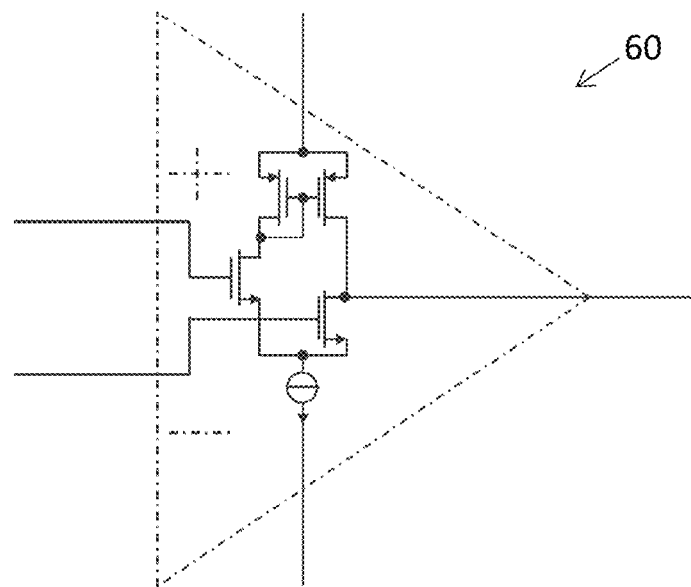
FIG. 10 shows a possible configuration of the operational amplifier of FIG. 9.

FIG. 10 shows a possible configuration of the operational amplifier 60 of FIG. 9. The operational amplifier 60 comprises a differential pair of the first stage with output as current source controlled with difference of inputs (in this case, the resistance 67 is omitted).

Figure 11:
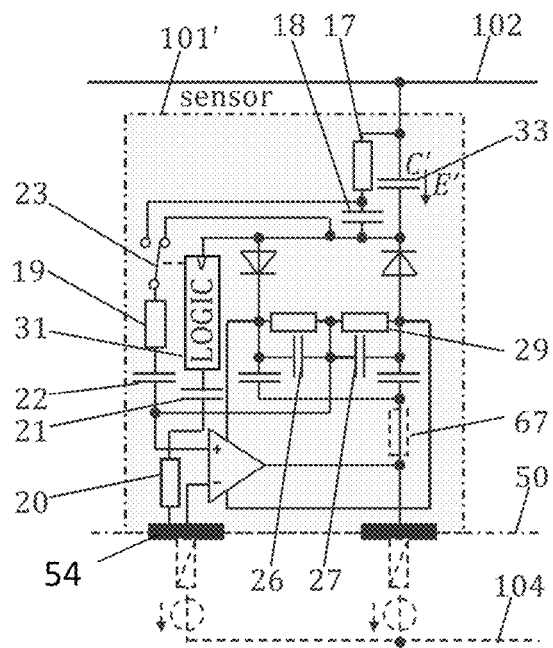
FIG. 11 shows variant of a cooperative sensor corresponding to the sensor, according to an embodiment.

FIG. 11 shows an implementation example of the cooperative sensor 101' corresponding to the sensor 101' of FIG. 8. The sensor current source 30 of FIG. 5 is implemented as a square wave (at, e.g., 500 Hz) produced by the LOGIC 31 (behaving with its output as voltage source) in series with the resistance 20 (a voltage source in series with an impedance is the Thevenin equivalent of a current source in parallel with the same impedance). The output resistance of the sensor current source 30 of FIG. 5 is the resistance 20 magnified by G+1 since the potential electrode 54 is a virtual ground (negative input of operational amplifier). The capacitance 21 makes the current-source output impedance higher for lower frequencies and ensures that no direct current flows across the body 104. The capacitance voltage E' across the capacitance 33 is low-pass filtered by the resistance 17 and capacitance 18 such as to isolate the bio-potential part with enough antialiasing filtering to be sampled/modulated by switch 23. A band-pass filter comprising resistance 19, capacitance 22, resistances 28, 29, and capacitances 26, 27 ensures that the transfer signal d remains in a well-defined frequency band.

Figure 12:
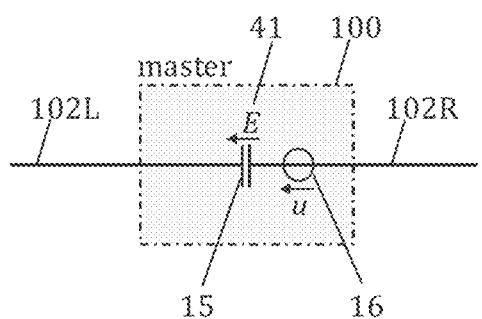
FIG. 12 shows the master, according to an embodiment.

FIG. 12 shows an alternative implementation of the master 100, wherein the master current source 40 comprising a voltage source u 16 in series with a capacitance 15.

Figure 13:
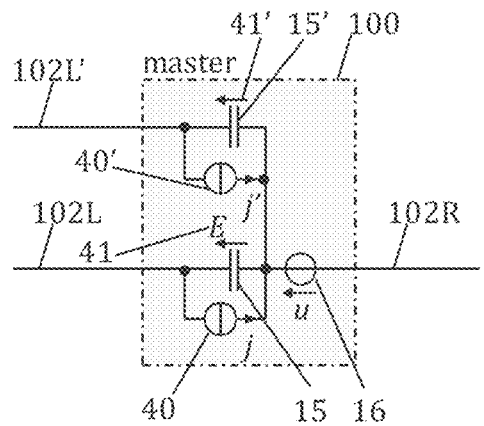
FIG. 13 shows the master, according to another embodiment.

FIG. 13 shows another alternative implementation of the master 100 featuring two one-wire connectors 102L and 102L' powered by the same voltage source 16 via two capacitances 15 and 15'. The master voltages 41 and 41' are measured across the capacitances 15 and 15'. If a current j or j' has to be used for bio-impedance measurement, a master current source 40 or 40' can be added.

Figure 14:
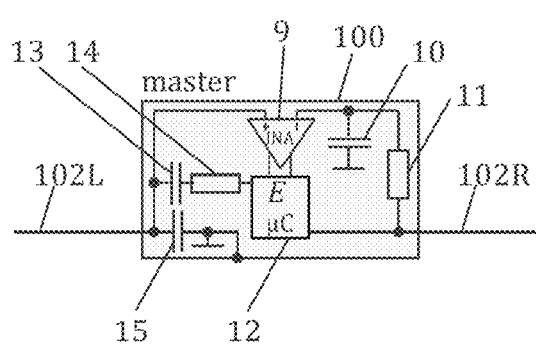
FIG. 14 shows the master, according to yet another embodiment.

FIG. 14 shows yet another alternative implementation of the master 100. Here, a microcontroller μC 12 plays the role of voltage source 16 (see FIG. 12), e.g., with a square wave at 1 MHz as digital signal at the connector 102R. The resistance 11 and capacitance 10 as low-pass filter provide a reference for the instrumentation amplifier 9 which is connected to an ADC (analogue-to-digital converter) of the microcontroller 12. The positive terminal of the instrumentation amplifier 9 is connected to the wire 102L for measuring the master voltage E 41. The resistance 14 allows the microcontroller 12 to generate with a digital signal a square-wave current j, e.g., at 50 kHz, for the bio-impedance measurement at this frequency. The capacitance 13 increases the output impedance of the master current source 40 at low frequencies as well as prevents any direct current to flow across the body 104. The shield for the master housing is connected to ground, as shown in FIG. 14.

Figure 15:
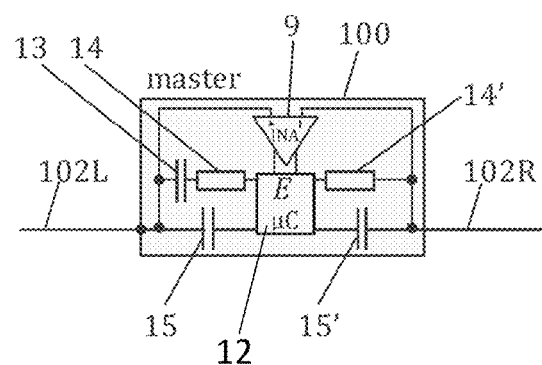
FIG. 15 shows the master, according to yet another embodiment.

In yet another alternative implementation of the master 100 shown in FIG. 15, the generation of powering and bio-impedance currents j uses a push-pull approach. The capacitance 15 is now on both connectors 102L and 102R. The same applies for the output resistance 14 of the master current source 40. Therefore, both powering and bio-impedance current are generated by digital signals from the microcontroller 12 with opposite phase for the two connectors 102L and 102R. This allows to double the available voltage and possibly increase the output impedance of the master current source 40. Note that the capacitance 13 is not doubled to fix the master potential with respect to the body at 0 Hz. The drawback of this approach is that the instrumentation amplifier 9 has a large voltage at powering frequency, requiring a good filter to avoid aliasing. The shield for the master housing is connected to connector 102L (or to connector 102R) as shown in FIG. 15.

Figure 16:
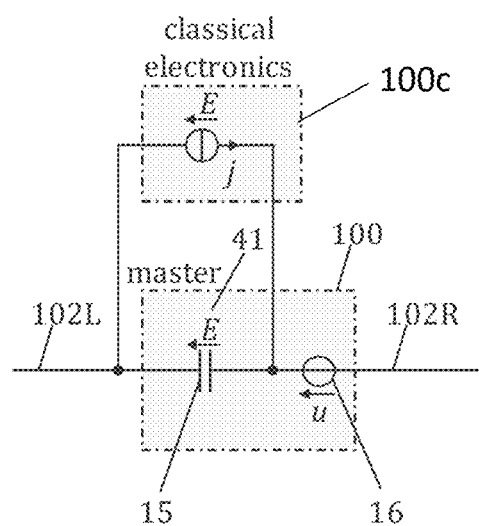
FIG. 16 illustrates the sensor device comprising conventional electronics.

FIG. 16 shows how the sensor device can be used with conventional electronics 100c destined to measure bio-potential and bio-impedance (voltage E and current source j) with gel electrodes. Instead of gel electrodes, the bi-electrode cooperative sensors 101R and 101L (e.g., the circuit of FIG. 9 with the two electrodes 54 and 51) are used with a master 100 connected to the conventional electronics in the way shown in FIG. 16.

Another example is shown in FIG. 17 where the extension of a conventional ECG electronics with a neutral electrode N (also called RL, i.e., right-leg electrode) originally designed with gel electrodes is depicted. A capacitance 41 and a connector 102L is used per electrode, except for the neutral electrode which is connected to one terminal of the voltage source 16, the other being connected to the connector 102R.

FIGS. 18a and 18b show that the sensor device described herein can be deployed as a strap similar to conventional heartrate straps, with the central electronics (master) 100 typically in the middle and connecting the connectors 102L and 102R which can be for instance conductive textiles. In other words, the sensor device can comprise a garment including the master 100 and the cooperative sensors 101L, 101R, wherein the connectors 102L and 102L comprise conductive textile of the garment 80.

The sensor device can be used as an enhanced chest strap. No shield is needed to measure possible signals with good quality, even if the connectors are long. Long connectors allow, for instance, to have a front zipper with one of the connectors reaching the other side by the body back.

The master 100 can be connected to the strap with only two snap connectors, as conventional chest straps, which is considered as an advantage as compared to more (connecting) snaps (cheaper, smaller, easier to snap).

The sensor device allows the measurement of bio-impedance with a two-connector solution as if it was measured with four-connector solution, i.e., with the tetrapolar method (two electrodes for current injection and two electrodes for potential measurement).

The remotely powered active bi-electrode 101L and 101R allows for higher quality measurement of bio-potentials (ECG) especially when dry (i.e., unwetted), in motion, or in electromagnetically disturbed environments. Moreover, four-electrode bio-impedance can also be measured, for instance to derive respiration rate, tidal amplitude, respiratory volume, etc. The cooperative sensors 101L and 101R may be extended with additional signals measured from the skin, such as temperature, photoplethysmography, body sounds, sweat chemicals, EDA (electrodermal activity, also known as GSR, galvanic skin response), etc. Note that if the cooperative sensors 101L and 101R are under the armpit, they can in addition measure core body temperature, provided that the arm is kept in close contact to the torso for long enough.

FIG. 19 shows a variant, where the cooperative sensors 101L and 101R are located at the upper arms, a position interesting for ECG (Einthoven's lead I), linearity of respiration volume with impedance, PPG (photoplethysmography) used for $SpO_2$ (pulse saturation of oxygen, i.e., pulse oximetry), or/and oBPM® (optical blood pressure monitor). Cooperative sensors 101L and 101R may also be placed under the armpit to measure core body temperature. In this variant, the sensor device may also be used for babies or animals. The location of the cooperative sensors 101L and 101R at the upper arm allows for easy monitoring of the core body temperature and photoplethysmography is less affected by light disturbance. Moreover, as there is no wireless antenna in the cooperative sensors 101L, 101R, there is no body shadowing if the sensors 101L, 101R are under the upper arm (e.g., armpit). The master 100 can be part of a necklace and if wireless communication is desired, there is no issue to have the antenna at this position.

FIGS. 20a, 20b, 20c, and 20d show another variant where each cooperative sensor 101L, 101R comprises a sensor part 111 including the current and potential electrodes 51, 54 and a counterpart 82. The counterpart 82 can be attachable to an external side of the garment 80 and configured to attach the sensor part 111 on an internal side of the garment 80 such that the current and potential electrodes 51, 54 are in contact with the body surface 50 when the garment is worn by the user.

The cooperative sensors 101L and 101R can be fixed on undershirt or bra with the counterpart 82 used as contact with the conductive parts 102L and 102R of a compressive strap that can be worn on top of the cooperative sensors 101L and 101R when multi-physiological measurements are required. The garment allows having the (vertical and horizontal) positioning of the sensors on the body and the compressive strap the compression and connection with the sensors.

The counterpart 82 can be attached to the sensor part 111 by using a pin 85. The pin 85 can also be used to connect the sensor part 111 to the connector 102L, 102R via the counterpart 82.

This configuration of the cooperative sensor 101L, 101R allows for transforming usual undershirts or bras in wearables. The mating of sensor part 111 and counterpart 82 may be obtained with magnets or any type of fastening means. The pin 85 can be in the center of the sensor part 111 as shown in FIG. 20b, but other configurations are possible. For example, three pins can be used at the periphery of the sensor part 111. The placement and mating of the cooperative sensor 101L, 101R on the garment 80 may be done with the undershirt or bra unworn from landmarks placed on the undershirt or bra when worn. Such landmarks may be, e.g., stickers or ink/paint, or directly the counterpart 82 with pressure-sensitive adhesive. The undershirt or bra can be washed with the sensors 101L and 101R, as well as worn as usual, e.g., loosely, when monitoring is not desired. The latter configuration may be particularly interesting for hygienic reasons, e.g., in settings where the strap must be reused for several patients or when the frequency and efficiency of cleaning of the strap and master is lower than of undershirt or bra. The sensor part 111 can include a chip (IC, integrated circuit) 81. Such sensor part 111 are low-cost and specific for a given user. The two electrodes 51 and 54 may comprise a ring and a disc as shown in FIGS. 20b and 20d. They can also comprise two side-by-side electrodes.

REFERENCE NUMERAL USED IN THE FIGURES 9 instrumentation amplifier
10 capacitance for low-pass filter for reference potential
11 resistance for low-pass filter for reference potential
12 microcontroller
13 capacitance
14 output resistance of current source 40
15 capacitance
16 voltage source u
17 resistance for antialiasing low-pass filter
18 capacitance for antialiasing low-pass filter
19 resistance for low-pass part of transferred-signal band-pass filter (1 of m')
20 resistance to convert voltage source to current source 30
21 capacitance to increase output impedance of current source 30 in bio-potential frequency band
22 capacitance for high-pass part of transferred-signal band-pass filter
23 modulation switch
26, 27 capacitance for low-pass part of transferred-signal band-pass filter
28, 29 resistance for high-pass part of transferred-signal band-pass filter
30 sensor current source
31 L logic circuit
32 modulator
33 C, C', C" capacitance
34 pass-through circuit 40, 40' master current source
41, 41', master voltage E
42 controller voltage V
43 transfer voltage source
44 adder
45 controller, -G
46 sensor voltage source
47 master current
48 harvesting transfer function
49 harvesting voltage source
50 skin
51 current electrode
52, 52' electrode potential, half-cell potential
53, 53' electrode impedance
54, 54' potential electrode
60 operational amplifier
61, 62 energy-storage capacitance
63, 64 resistances of voltage divider
65, 66 rectifier diode
80 underwear
81 electronics of cooperative sensor
82 fastener and back contact, counterpart
85 pin
100 master
100c conventional electronics
101 cooperative sensor
101', 101" cooperative sensor
101L first cooperative sensor
101R second cooperative sensor
102 connector
102L, 102L' first connector
102R second connector
104 body
111 sensor part
41 capacitance (FIG. 16)
d, d', d" transfer signal
e, e', e" bio-potential, bio-voltage
E voltage to measure
E capacitance voltage
G controller transfer function
H harvester function
i current
IC integrated circuit
J, j', j" current
m carrier
pC microcontroller
R relative to right 1-wire bus
u voltage
v voltage, potential
y bio-admittance, equal to 1/z
z, z', z" bio-impedance

The invention claimed is:

1. Sensor device for potential and/or impedance measurements on a body of a user, comprising a central electronic unit and at least a first sensor and a second sensor, each sensor being connected to the central electronic unit by a one-wire connector;

each sensor comprising a current electrode and a potential electrode configured to be in contact with a surface of the body;

the central electronic unit comprising a master current source configured to circulate a master current j in the one-wire connector, the current electrode of said at least first and second sensors, and the body, when the sensors are in contact with a surface of the body;

each sensor comprising a harvesting device configured to harvest energy from the circulating master current in a powering frequency band;

wherein the harvesting device comprises a harvesting voltage source with voltage determined by a harvesting transfer function H from the master current;

wherein the central electronic unit is configured to measure a biopotential (e) of the body from a master voltage across the master current source, the master voltage being in a bio-potential frequency band; and wherein the central electronic unit is configured to measure a bio-impedance of the body from the master voltage when the master current is in a bio-impedance frequency band.

2. The sensor device according to claim 1, wherein at least one of the first and second sensors comprises a sensor voltage source, an adder and a controller having a transfer function-G;

the adder being configured to sum a voltage to a transfer signal and input the sum in the controller;

wherein the controller is configured to set the voltage equal to the opposite of the transfer signal and to output a voltage of the voltage source.

3. The sensor device according to claim 2, wherein the transfer function-G is configured such that a rejection frequency band of a control loop of the controller is maximal in a bio-potential and/or bio-impedance and minimal in a powering frequency band.

4. The sensor device according to claim 2, wherein the transfer function-G is further configured such that a rejection frequency band of the control loop of the controller is maximal in a communication frequency band; and wherein the master voltage further includes the transfer signal such that the signals other than bio-potential and bio-impedance signals can be acquired by the central electronic unit.

5. The sensor device according to claim 4, wherein the powering frequency band is about 1 MHz or greater, the bio-potential frequency band is between 0.5 Hz and 150 Hz, the bio-impedance frequency band is between 49.5 kHz and 50.5 kHz, and the rejection frequency band is between 1 kHz and 49.5 kHz.

6. The sensor device according to claim 1, wherein each sensor comprises a logic circuit clocked from the edges of master current.

7. The sensor device according to claim 1, wherein each sensor comprises a sensor current source configured to inject a sensor current into an electrode impedance of the potential electrode.

8. The sensor device according to claim 1, comprising a plurality of the first sensor and/or the second sensor.

9. The sensor device according to claim 8, wherein each sensor comprises a capacitance configured to average biopotentials, bio-admittances and a transfer signal from the plurality of first and/or second sensors connected to the central electronic unit by a same one-wire connector.

10. The sensor device according to claim 9, wherein each sensor comprises a modulator configured to modulate a capacitance voltage across the capacitance with a carrier and output the transfer signals.

11. The sensor device according to claim 10, wherein the multiplier is configured to perform amplitude modulation between the capacitance voltage and the carrier.

12. The sensor device according to claim 1, comprising a garment including the central electronic unit and the first and second sensors and wherein the one-wire connector comprises conductive textile of the garment.

13. The sensor device according to claim 12, wherein each sensor comprises a sensor part including the current and potential electrodes and a counterpart, the counterpart being attachable to an external side of the garment and configured to attach the sensor part on an internal side of the garment such that the current and potential electrodes are in contact the body surface when the garment is worn by the user.

* * * * *